March 31, 1953  C. E. SUMMERS  2,633,114
MEANS FOR VAPORIZING THE LIQUID PORTIONS OF THE
FUEL CHARGE OF INTERNAL-COMBUSTION ENGINES
Filed May 24, 1950  2 SHEETS—SHEET 1

*INVENTOR.*
CALEB E. SUMMERS

ATTORNEYS

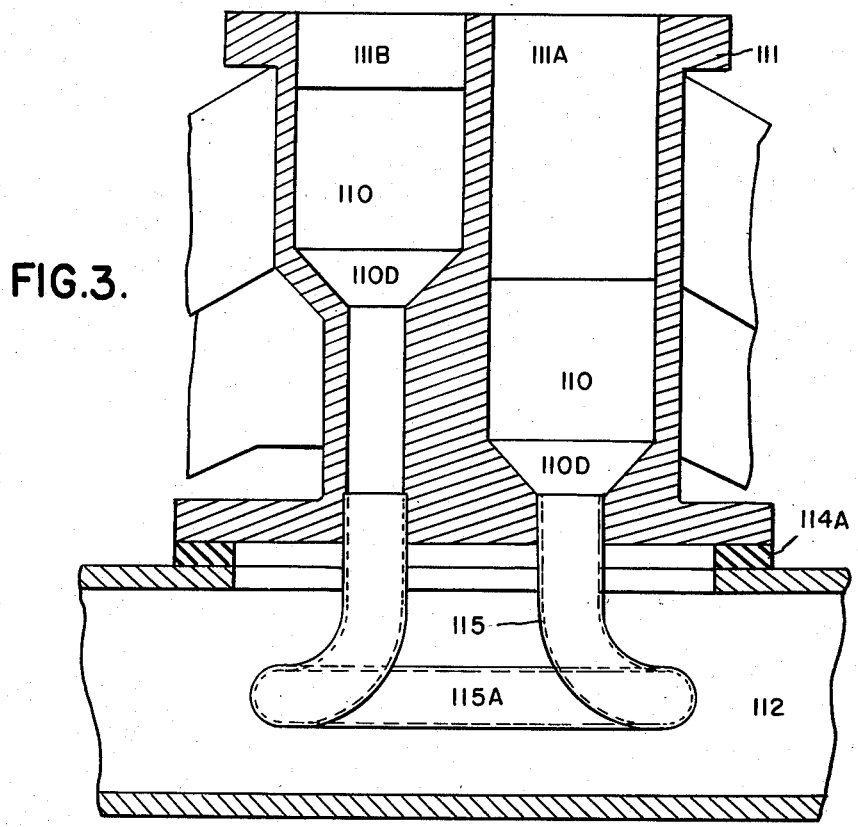
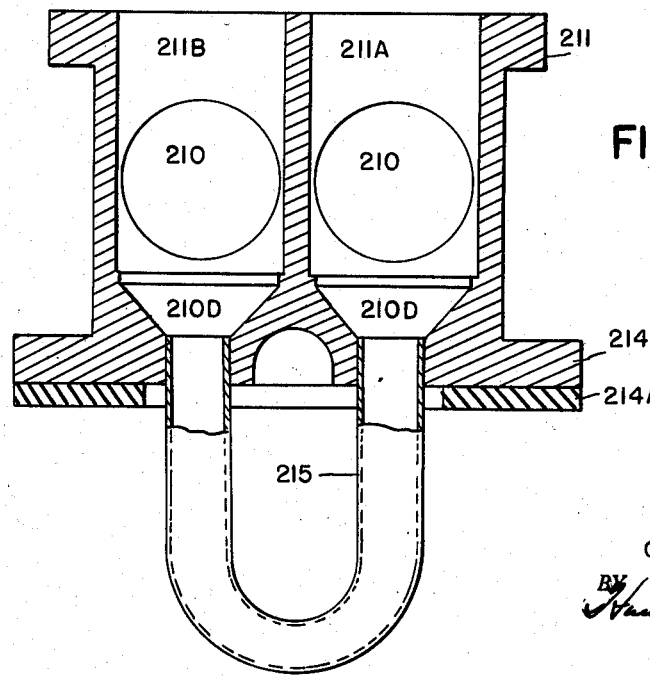
FIG.3.
FIG.4.
INVENTOR.
CALEB E. SUMMERS
ATTORNEYS

Patented Mar. 31, 1953

2,633,114

UNITED STATES PATENT OFFICE 2,633,114

MEANS FOR VAPORIZING THE LIQUID PORTIONS OF THE FUEL CHARGE OF INTERNAL-COMBUSTION ENGINES

Caleb E. Summers, Orchard Lake, Mich.

Application May 24, 1950, Serial No. 163,858

6 Claims. (Cl. 123—122)

The present invention relates to internal combustion engines and specifically to methods of and means for controlling the heating of fuel charges supplied thereto.

In internal combustion engines, a considerable part of the presently used fuels pass into the manifold through the carburetor as droplets of liquid fuel, only a portion of the fuel being vaporized. And, since such a foggy mixture of air, gaseous fuel and fog presents problems of distribution and other difficulties, it is customary to provide means for heating such mixtures from the exhaust of the engine, using so-called "hot spots." These involve rather heavy castings of several pounds of metal and are consequently slow in heating and will not fluctuate to provide proper heating to accord with the operating conditions and their changes. Such "hot spots" are usually a compromise and result in too little heating for part load operation and too much heating for full load conditions.

Among the objects of the present invention is a method of and means for vaporization of the liquid portion of fuel charges for internal combustion engines through the use of exhaust heat, in which the heating effect varies with load conditions.

Another object is means for exhaust heating in which such variation is accomplished without moving parts.

Another object is vaporization means which is automatically responsive to fuel quality.

Another object is to provide vaporization means automatically responsive to the vaporization state of the fuel.

Still other objects and advantages will readily occur to those skilled in the art upon reference to the following description and the accompanying drawings in which Fig. 1 is a top plan view showing the manifolding of an engine embodying the present invention.

Fig. 3 is a sectional view similar to Fig. 2, but showing the invention as applied to a V-eight engine having a 90° crankshaft.

Fig. 4 is a view similar to Fig. 2 showing the invention as applied to a straight eight cylinder engine.

Figure 1:
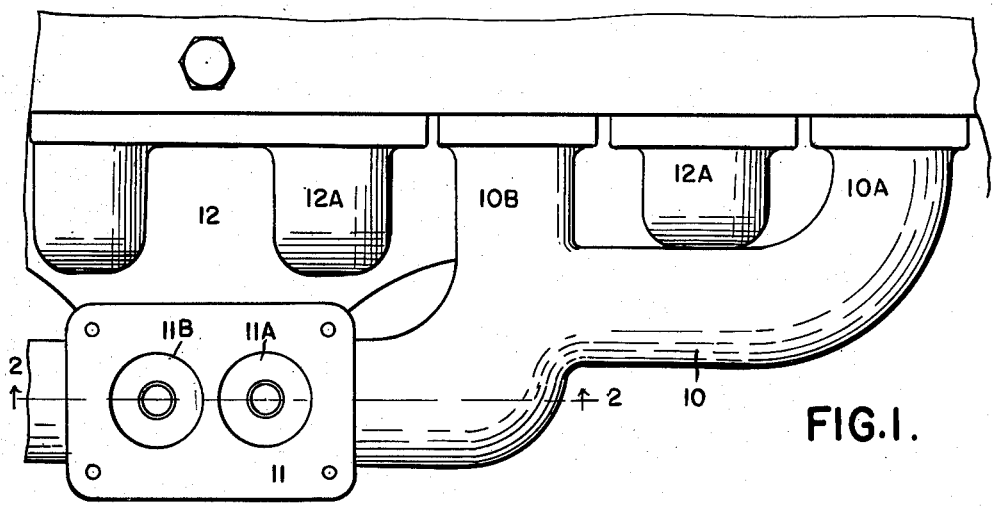

As indicated in the drawings, the present invention is primarily for engines using a dual carburetor and divided manifold and will be described in such connection.

Insofar as the present invention is concerned, the term "divided manifold" is intended to apply only to multiple cylinder engine intake manifolds, in which one portion of the manifold serves a group of the cylinders and another portion serves a separate group, the two portions having no intercommunication and being supplied fuel mixture from a dual carburetor.

In Fig. 1, which shows the manifolding of a six cylinder engine adapted for use with a down draft dual carburetor, the intake manifold is shown at 10, having a branch 10A leading to an end cylinder and another branch 10B leading to the next two cylinders. A suitable pad 11 is provided on the top of the manifold and upon this is mounted a conventional dual carburetor (not shown), with one of its outlets registering with each of the openings 11A and 11B.

The exhaust manifold is indicated at 12 and is provided with branches 12A extending from the engine cylinders and with a chamber 12B located directly below the pad 11.

Figure 2:
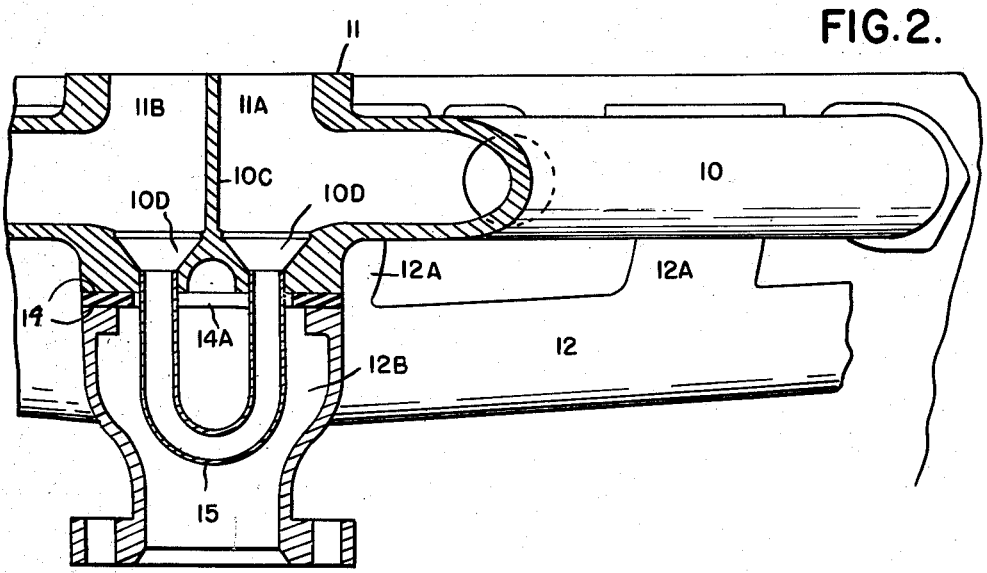
Fig. 2 is a section on line 2—2 of Fig. 1.

As shown clearly in Fig. 2, the intake manifold 10 is divided centrally by means of a partition 10C and its lower wall, directly opposite the openings 11A and 11B and on either side of the partition, is provided with dispersions 10D.

Fitted to and opening into these depressions is a short U-tube 15, the greater portion of which extends down into the chamber 12B of the exhaust manifold. Both manifolds are provided at this location with suitable machined surfaces 14 adapted to be fixed together with the interposition of a suitable gasket 14A of heat insulating material.

The tube 15 is preferably of thin walled construction and should be made of such material as will withstand the heating of the exhaust gases, such as stainless steel.

In Fig. 3, the mounting pad for the carburetor (not shown) is indicated at 111, the openings to the intake manifold at 111A and 111B. The branches of the intake manifold leading to the cylinders are indicated at 110 while the exhaust manifold is indicated at 112. In this figure, the two depressions 110D are shown at different levels because of the shape of the several manifolds and the U-tube 115 is shown as bent at its lower portion 115A so as to somewhat increase its length and yet permit its being accommodated in less space in the exhaust manifold.

In Fig. 4 the structure is similar in most respects to that shown in Fig. 2, the parts being similarly numbered.

In this figure, the supporting pad for the carburetor is shown at 211, the openings to the intake manifold at 211A and 211B. The branches of the intake manifold leading to the cylinders are indicated at 210. The flange for attachment to the exhaust manifold (not shown) is indicated at 214 with the heat insulating gasket at 214A. The depressions 210D, as in the previous figures, are connected by the tube 215 extending into the exhaust manifold.

In the operation of the vaporizer, a mixture of air with vaporized and unvaporized fuel issues from the carburetor throats into the openings 11A and 11B of the intake manifold 10. Since the direction of flow is vertically downward, any fuel droplets tend to be carried by their own inertia into the funnels or depressions 10D and by gravity into the vaporizer tube—the U-tube 15.

As is well known, motors equipped with dual carburetors draw fuel mixture alternately and symmetrically through one carburetor barrel or throat and then the other. This causes a vigorous surge of fluid through the tube 15, and since the tube 15 is heated by exhaust gases impinging upon it in the chamber 12B of exhaust manifold 12, mixtures of air and liquid fuel enter one end of the tube 15 and emerge at the other end as airborne vapor. The direction of flow in the tube 15 reverses as each succeeding cylinder draws a charge.

Even in the first few revolutions of the engine, and before there is any sensible heat in the tube 15, the high velocity surge through the tube tends to atomize the liquid fuel and keep it in the air stream and so give good operation immediately, even in cold weather.

It should be noted that there is no flow of heat from the exhaust manifold to the intake manifold because of the insulating gasket 14A. Consequently, the latter receives substantially no heat except from the hot mixture which has passed through tube 15. The vaporization takes place completely in the tube 15 and before there is any branching off to the individual cylinders; and, since there is no progressive vaporization as the mixture proceeds through the manifold, all cylinders receive an equal percentage of each fuel fraction. Thus, the distribution of fuel to the various cylinders is not only equal in quantity, but is equal in quality, anti-knock characteristics, etc.

As stated above, one of the objects of the present invention is to provide a means automatically responsive to the vaporization characteristics of the fuel in the mixture. In the case of fuels of high volatility, most of the fuel evaporates before leaving the carburetor and, in so doing, refrigerates the charge. The small percentage which reaches the tube 15 in a liquid state, evaporates immediately on entering the tube and takes up little heat. This, mixed with the larger volume of very cold mixture flowing in the manifold, provides the cylinders with a thoroughly vaporized but cold charge which is favorable to maximum volumetric efficiency and power. On the other hand, in the case of a fuel of low volatility, only a small percentage of the fuel vaporizes at the carburetor with a minimum refrigerating effect. The liquid fuel is precipitated into the funnel 10D and drawn through the tube 15. Being hard to vaporize, the fuel traverses most of the length of the tube 15 and attains a high temperature before coming out as a vapor. This large quantity of high temperature fluid, when mixed with the fluid already in the manifold and which did not traverse the tube 15, brings the whole manifold and its contents to a temperature that will prevent reliquification of the heavier fuel fractions en route to the cylinders.

Thus, by its own vaporization characteristics, the fuel automatically takes up just enough heat from tube 15 to obtain and maintain vaporization of its heavier fractions. The heat absorbing and releasing areas of the tube 15 are so chosen as to give the required amount of heat and no more.

Further, this vaporizing method is automatically responsive to the volumetric requirements of the motor load.

When a motor is operated at part load, it is of advantage to have the fuel mixture hot. When full load is demanded, it is necessary that the mixture be as cold as possible, consistent with distribution.

In the present design, the intake manifold is never hot but is only warm under all conditions, and the flow of mixture through the tube 15 is a function of the average cyclic pressure differential between the two ends of the tube 15, and this, in turn, is a function of the torque requirement and the throttle position.

Therefore, when the motor is operated at part load, for example in an automobile being driven at say from 20 to 50 M. P. H., and the manifold vacuum is from 10 to 16 inches of mercury, a high percentage of the mixture is drawn through the hot tube 15, because of the relatively large average pressure difference between the two ends of the tube 15. The temperature of the mixture as it reaches the cylinders is high.

However, when the throttle is opened in demand for full power, the collapse of the vacuum leaves only a small pressure difference between the two ends of the tube 15, so only the liquid fuel and a little air pass through and the mixture temperature immediately drops to a point as low as is consistent with good distribution.

The heating area and the freedom of flow through the tube 15 are chosen to provide for, as near as possible, the vaporization and flow suitable for full load operation. When this condition obtains, operation at less than full throttle will result in a greater flow and higher temperature of the mixture—a desirable result.

Since the average intercyclic pressure difference between the two ends of the tube 15 is greater in the six cylinder than in the eight cylinder engine, a greater cross sectional area of the tube 15 in the latter is desirable, and as stated above, if is is undesirable or impracticable to provide a chamber in the exhaust manifold for the reception of the tube 15, the tube may be bent in a manner similar to that shown in Fig. 3 so that it may be inserted into the smaller space.

I claim:

1. A divided intake manifold for use with a dual carburetor, having a bypass leading from one portion of said manifold adapted to be served by one barrel of said carburetor to the other portion adapted to be served by the other barrel of said carburetor, and means for applying heat from exhaust gases to said bypass.

2. A divided intake manifold for use with a dual carburetor, having a bypass leading from one portion of said manifold adapted to be served by one barrel of said carburetor to the other portion adapted to be served by the other barrel of said carburetor, an exhaust manifold, said bypass extending into said exhaust manifold, and means for preventing substantial conduction of heat from one manifold to the other.

3. A divided intake manifold for use with a dual carburetor having a bypass leading from one portion of said manifold adapted to be served by one barrel of said carburetor to the other portion adapted to be served by the other barrel of said carburetor, an exhaust manifold, said bypass consisting of a thin walled U-tube, and means for applying heat from exhaust gases to said bypass.

4. A divided intake manifold for use with a down draft dual carburetor, having a bypass leading from one portion of said manifold adapted to be served by one barrel of said carburetor to the other portion adapted to be served by the other barrel of said carburetor, said manifold also having a funnel like depression below each carburetor barrel to the bottom of which said bypass is connected, and means for applying heat from exhaust gases to said bypass.

5. In a multiple cylinder internal combustion engine an exhaust manifold, a divided intake manifold adapted to be served by a dual carburetor surmounting said exhaust manifold and fixed thereto, a thin walled U-tube connecting the two portions of said intake manifold and extending downwardly into said exhaust manifold and heat insulating means between said manifolds.

6. In a multiple cylinder internal combustion engine, having an exhaust manifold, a divided intake manifold and a dual carburetor, means for trapping liquid fuel fed to one portion of said divided manifold and means for vaporizing said liquid fuel and feeding said vapors to the other portion of said divided manifold, said vaporizing means consisting of a tube traversing a portion of said exhaust manifold and open at each end to one portion of said divided manifold, whereby cyclic pressure differential will cause a flow through said tube.

CALEB E. SUMMERS.

REFERENCES CITED

The following references are of record in the file of this patent:

UNITED STATES PATENTS

| Number | Name | Date |
|---|---|---|
| 1,431,280 | Benjamin | Oct. 10, 1922 |
| 1,676,955 | Kemp | July 10, 1928 |
| 2,062,433 | Van Ranst | Dec. 1, 1936 |

FOREIGN PATENTS

| Number | Country | Date |
|---|---|---|
| 563,895 | Great Britain | Sept. 4, 1944 |